United States Patent [19]

Miller

[11] Patent Number: 5,270,553

[45] Date of Patent: Dec. 14, 1993

[54] BEGINNING-OF-TAPE SENSOR WITH AUTOMATIC THRESHOLD ADJUSTMENT

[75] Inventor: Kevin L. Miller, Loveland, Colo.

[73] Assignee: Hewlett-Packard Company, Palo Alto, Calif.

[21] Appl. No.: 994,848

[22] Filed: Dec. 22, 1992

[51] Int. Cl.⁵ ............................................. G01N 21/86
[52] U.S. Cl. ................................ 250/559; 250/214 R
[58] Field of Search .......... 250/557, 559, 561, 214 A, 250/214 R; 242/188; 360/74.6; 307/311

[56] References Cited

U.S. PATENT DOCUMENTS

| | | | |
|---|---|---|---|
| 3,931,513 | 1/1976 | Germain | 250/205 |
| 4,372,672 | 2/1983 | Pries | 250/559 |
| 4,410,148 | 10/1983 | Dunlap | 242/188 |
| 4,570,075 | 2/1986 | Spiero | 250/570 |
| 5,073,700 | 12/1991 | D'Onofrio | 250/557 |

Primary Examiner—Edward P. Westin
Assistant Examiner—K. Shami
Attorney, Agent, or Firm—Augustus W. Winfield

[57] ABSTRACT

An optical beginning-of-tape detection device with automatic threshold adjustment. In a first embodiment, at two different locations on a tape, a comparator threshold is varied until the comparator switches states. The two locations are sufficiently far apart to guarantee that at least one measurement is not at the beginning-of-tape indication area. The greater of the two thresholds is used, with a predetermined offset for noise margin. In a second embodiment, the threshold is continuously adjusted through a diode across the comparator inputs. The threshold is initialized by moving the tape sufficiently far to guarantee that at some time during initialization the sensor is not at the beginning-of-tape indication area.

12 Claims, 7 Drawing Sheets

BEGINNING-OF-TAPE SENSOR WITH AUTOMATIC THRESHOLD ADJUSTMENT

FIELD OF INVENTION

This invention relates to tape drives for computer data storage and more particularly to sensing the beginning of the tape and the end of the tape.

BACKGROUND OF THE INVENTION

In general, tapes for data storage have some sort of indicator for optical detection of the beginning of the tape and the end of the tape. Indicators include transparent leaders and trailers, reflective leaders and trailers, reflective markers and various patterns of holes punched in the tape. A typical sensing apparatus uses a light source and a light-sensitive sensor to detect light reflected from a reflective leader/trailer/marker, light transmitted through holes or light transmitted through a transparent leader/trailer. In a typical sensing apparatus, the sensor generates a signal if light impinging on the sensor exceeds a fixed threshold. However, light reaching a sensor may vary for several reasons unrelated to the presence or absence of an indicator. Dust may accumulate on the light source or the sensor. Dust may partially clog a hole in the light path or one of the holes in the tape. Parts of the tape may be slightly transparent. The light source intensity or the sensor sensitivity may change with age or temperature. Various sources of ambient light may interfere. Finally, there may be inherent differences due to manufacturing tolerances for the light intensity, the sensor sensitivity, and other components in the light path.

Prior art approaches to the general problem have used continuous feedback to control the intensity of the light source, to control the gain of the sensor, or to filter the sensor signal. For example, U.S. Pat. No. 3,931,513, issued to Germain, discloses continuous analog feedback to control light intensity in a system using reflective markers. The type of tape used in Germain has a reflective marker on one edge of the tape for a beginning-of-tape indicator and a reflective marker on the opposite edge for an end-of-tape indicator. Separate sensors are used for beginning-of-tape and end-of-tape. Germain discloses a way to maintain a controlled light intensity even when a reflective marker is in the light path. When a reflective marker is in the light path, the sensor receiving the least light is used for feedback to control light intensity.

Similarly, in U.S. Pat. No. 4,410,148 issued to Dunlap, feedback is provided to control light intensity. In Dunlap, there is a time delay in the feedback so that when a reflective marker passes the sensor area, the light intensity is not changed immediately.

In U.S. Pat. No. 4,570,075, issued to Spiero, the light source is operated in a pulsed mode. By using filters, the high frequency light emitted from the pulsing light source is distinguished from lower frequency ambient light. In addition, the lower frequency ambient light component is used for continuous negative analog feedback to the sensor.

The prior art solutions provide analog feedback to control light intensity or sensor sensitivity. Lower cost solutions are needed which take advantage of the control and flexibility of on-board microprocessors. With low cost microprocessors and digital circuitry available in Application Specific Integrated Circuits (ASIC), a digital approach can provide a lower cost solution and fewer parts. Alternatively, for an analog solution, the microprocessor can be used to simplify the analog circuitry.

SUMMARY OF THE INVENTION

The present invention provides a variable threshold light sensing device for detecting the beginning of the tape and the ending of the tape in a tape drive. In one embodiment, the threshold is changed with each tape change or when the drive is turned on with a tape already present. In another embodiment, the threshold changes continuously as long as no indicator is present. In each embodiment, the threshold is adapted to tape specific variation as well as non-tape variations such as inherent light source and sensor variation, light source degradation, and accumulation of dust.

In the first embodiment, at two different locations on a tape, a comparator threshold is varied until the comparator switches states. The two locations are sufficiently far apart to guarantee that at least one measurement is not at the beginning-of-tape indication area. The greater of the two thresholds is used as a final threshold, with a predetermined offset for noise margin.

In the second embodiment, the threshold is adjusted continuously as long as there is no indicator present. When an indicator is present, a diode prevents any threshold change. When a tape is changed or when the drive is turned on with a tape present, a controller ensures that the tape is moved to an area where an indicator is not present.

DETAILED DESCRIPTION OF THE PREFERRED EMBODIMENT OF THE INVENTION

Figure 1:
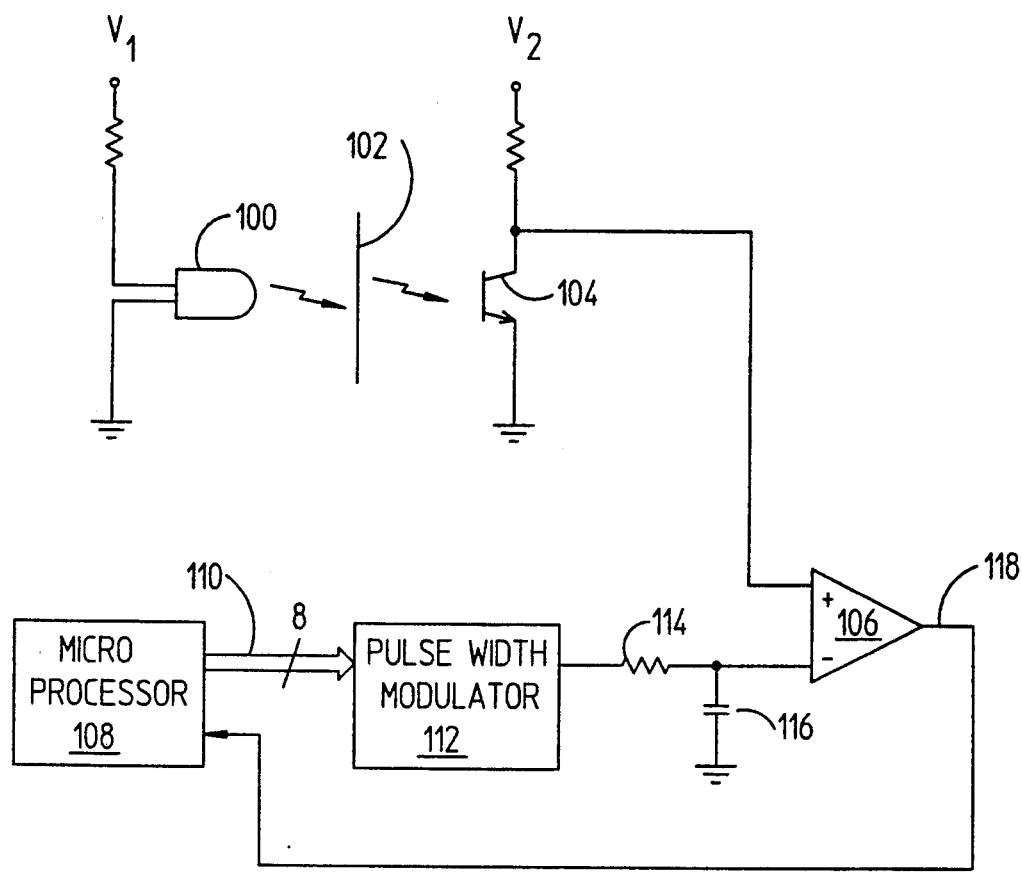
FIG. 1 is a block diagram schematic of a first embodiment of the present invention for use with transparent indicators.

FIG. 1 is a block diagram schematic of a first embodiment of the present invention. Light source 100 provides light for transmission through a tape 102. The light may pass through a transparent leader/trailer or holes in the tape 102. A phototransistor 104 receives the transmitted light and provides one input signal to an analog comparator 106. A microprocessor 108 provides a digital value 110 to a pulse-width-modulator (PWM) 112. The output of the PWM 112 is low-pass filtered by resistor 114 and capacitor 116 to provide a second input signal to the analog comparator 106. The PWM 112 and low pass filter provide the function of digital to analog conversion. The microprocessor 108 also senses the one-bit digital output 118 of the analog comparator.

The microprocessor 108 is used for multiple drive functions, including tape movement. When a tape is inserted or when power is turned on with a tape already inserted, the microprocessor 108 goes through an initialization procedure. As part of that initialization procedure, the microprocessor sends a series of digital values 110 to the PWM 112. The digital values 110 start at zero and increase one bit at a time until the output 118 of the analog comparator 106 changes state. The digital value 110 at which the output 118 changes state is saved as Threshold(1).

If it can be guaranteed that there is no indicator present when Threshold(1) is determined, then the threshold used for that tape is Threshold(1) less a predetermined offset for noise margin. For example, in some tape drives, the tape may always be left at the beginning of data rather than at the beginning of the tape. However, in general, when Threshold(1) is determined, the microprocessor 108 may not know whether the tape 102 is at a transparent area (leader/trailer or holes) or whether the tape 102 is at an opaque area. The microprocessor 108 then moves the tape 102 far enough to guarantee that any transparent indicator has moved beyond the sensor area. For example, for a tape with holes, the tape typically needs to be moved approximately one inch. For a transparent leader, the tape needs to be moved more than the length of the leader which may be several feet. After moving the tape, the microprocessor 108 again sends increasing digital values 110 to the pulse-width-modulator 112 until the comparator output 118 changes state. This new digital value 110 is saved as Threshold(2).

It may be that the tape 102 is in a transparent area when Threshold(1) is determined and an opaque area when Threshold(2) is determined. The opposite may also be true. The tape 102 may be at an opaque area when Threshold(1) is determined and at a transparent area when Threshold(2) is determined. Alternatively, the tape 102 may be at an opaque area when both Threshold(1) and Threshold(2) are determined. However, by moving the tape a sufficient distance between measurements, it cannot be true that the tape was in a transparent area when both measurements were taken. Therefore, the greater of Threshold(1) and Threshold(2) must represent the threshold at an opaque area of the tape 102. The microprocessor 108 takes the greatest value of Threshold(1) and Threshold(2), subtracts a suitable value for noise margin, and saves the result as the threshold to use for the tape presently inserted.

Figure 2:
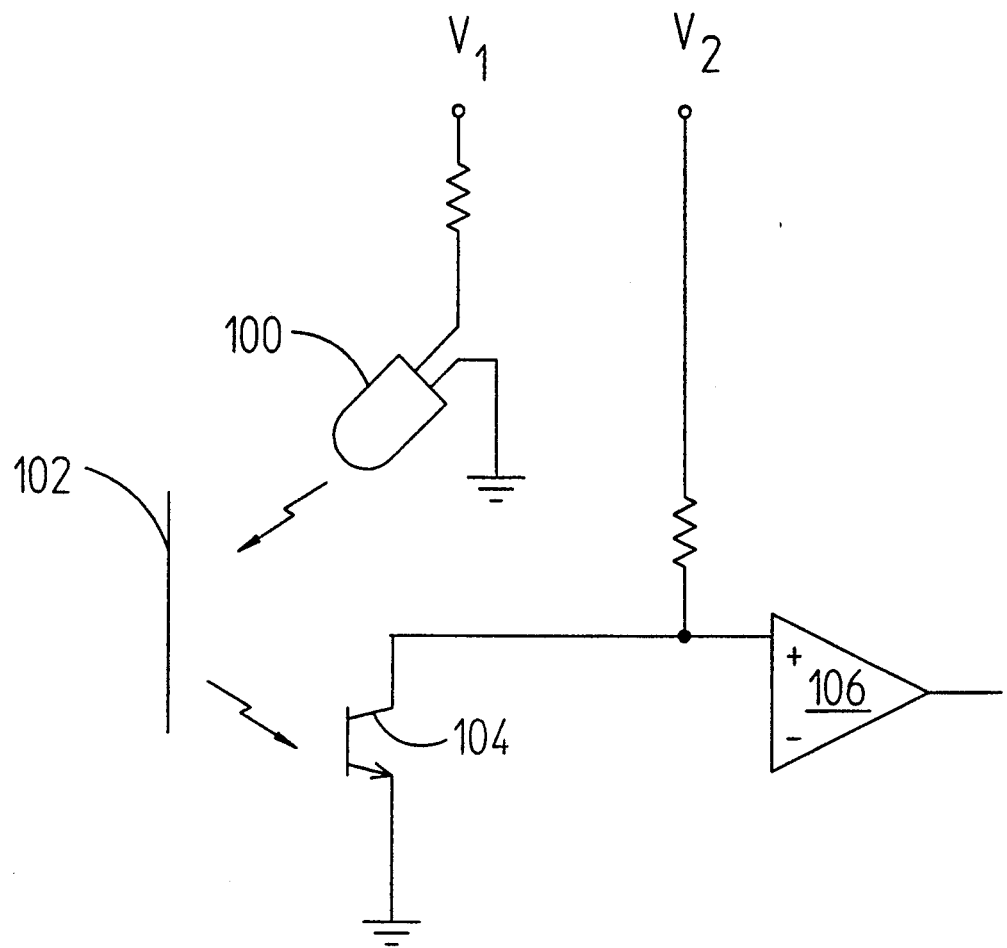
FIG. 2 is a partial block diagram schematic illustrating the use of the first embodiment of the present invention for reflective indicators.

FIG. 2 illustrates an alternative configuration for the first embodiment using a reflective leader/trailer. As illustrated in FIG. 2, light source 100 provides light which reflects off the tape 102 to illuminate the phototransistor 104. Otherwise, the operation is the same as that provided above for FIG. 1. If the leader/trailer is reflective, more light reaches the phototransistor 104. Therefore, the threshold at which the comparator output 118 switches is lower for reflective tape than for non-reflective tape. As in FIG. 1, the microprocessor 108 may not know initially if there is an indicator present. Therefore, as in FIG. 1, the microprocessor 108 takes two measurements on two parts of the tape 102, takes the greater of the two measurements, subtracts a value for noise margin, and saves the result as the threshold to use for the tape presently inserted.

Figure 3:
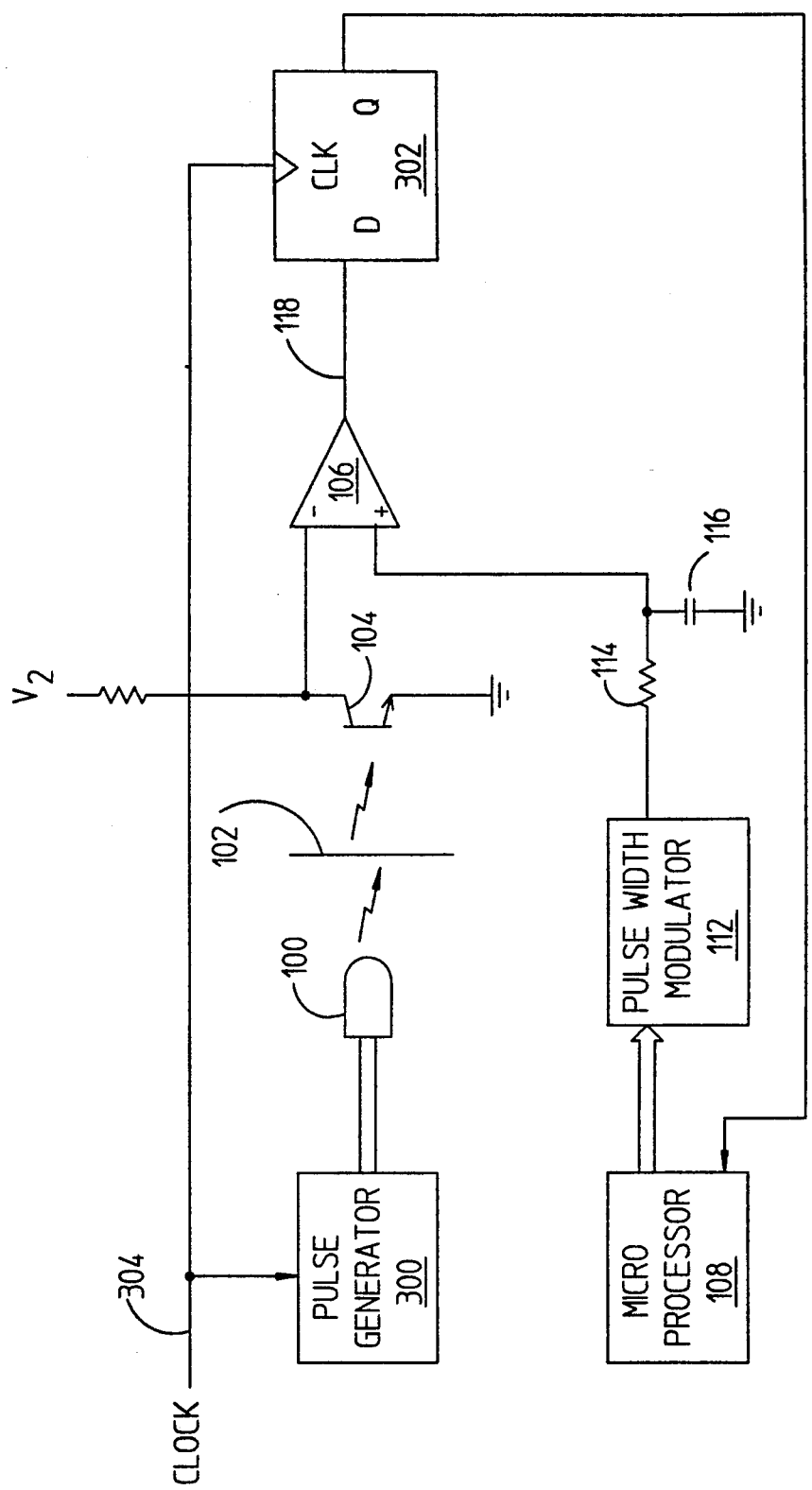
FIG. 3 is a block diagram schematic illustrating an alternative of the first embodiment using a pulsing light source.

FIG. 3 illustrates a variation of the first embodiment with enhanced light intensity and efficiency. The light source 100 can be used in a pulsed mode in which the current (and light intensity) during each pulse exceeds the average current for continuous operation as in FIG. 1. This allows higher peak light intensity at the same or lower average power. If the light source 100 is pulsed, the comparator output 118 may also pulse. Therefore, the output of comparator 118 needs to be sampled only when the light source 100 is on. By providing a common clock signal 304 to a pulse generator 300 and a flip-flop 302, the flip-flop 302 acts as a synchronous demodulator, sampling and storing the comparator output 118 during each pulse of the light source 100.

In a specific implementation of the present invention, the indicators are holes in the tape. The light source 100 is an LED pulsed at approximately 6,000 pulses per second with a 20% duty cycle (33 microsecond on-time). The tape is moved approximately one inch between threshold measurements. The range of the threshold input at the comparator 106 is 5 volts. The microprocessor 108 sends an 8-bit value to the pulse-width-modulator 112. A numeric value of approximately 25 is subtracted from Threshold(1) or Threshold(2) to provide approximately 0.5 volts of noise margin at the threshold input of comparator 106.

Figure 4:
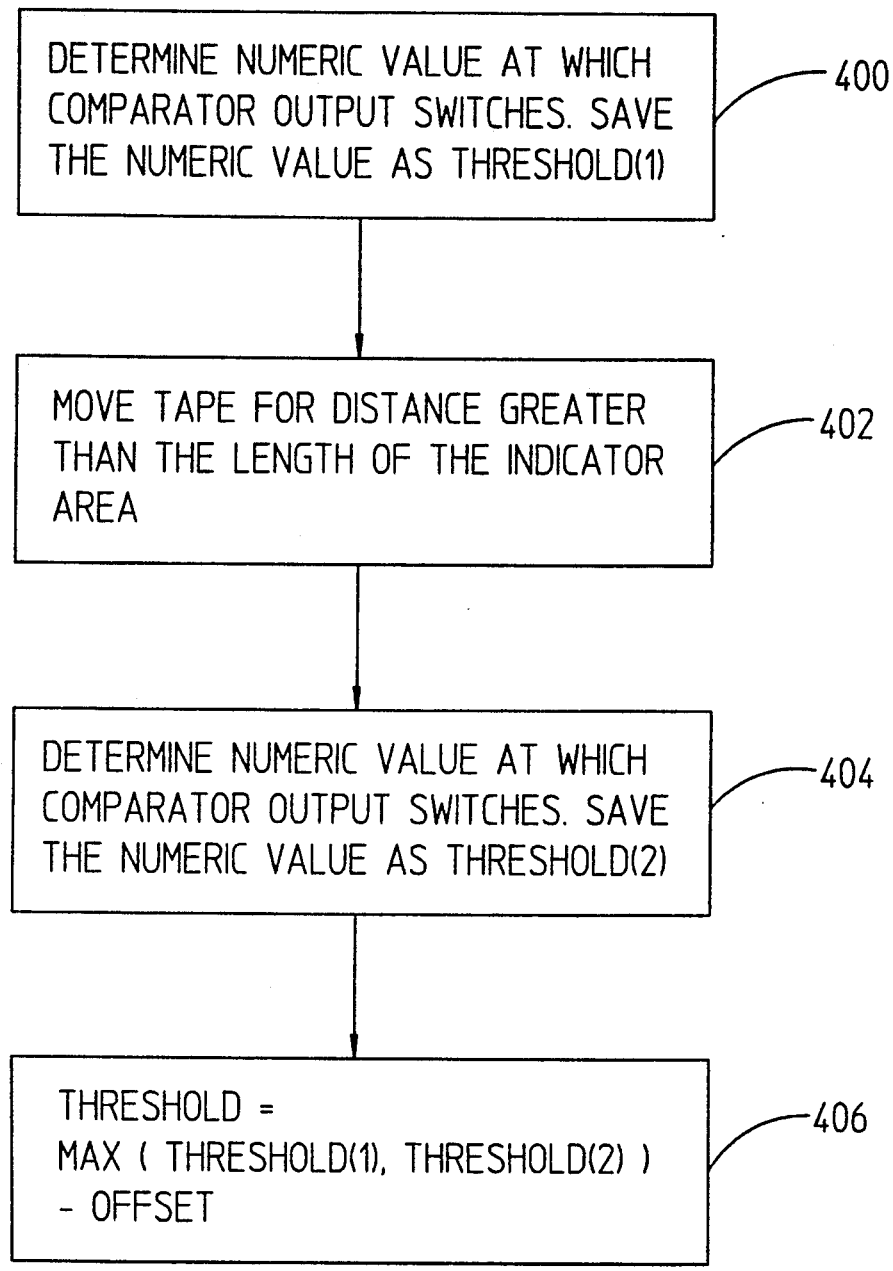
FIG. 4 is a flow chart of the method of implementing the first embodiment of the present invention.

FIG. 4 illustrates a flow chart for the method of implementing the first embodiment of the present invention. If a tape has been changed or power is turned on with a tape already installed, the method of FIG. 4 is implemented by the microprocessor. First, Threshold(1) is determined (box 400). If it can be guaranteed that the tape is not at an indicator area when changed or when power is turned on then Threshold(1) is the final threshold. Otherwise, for the general case, the tape is moved (box 402). Then Threshold(2) is determined (box 404). The final threshold used is the maximum value of Threshold(1) and Threshold(2) less an offset value for noise margin (box 406).

Figure 5:
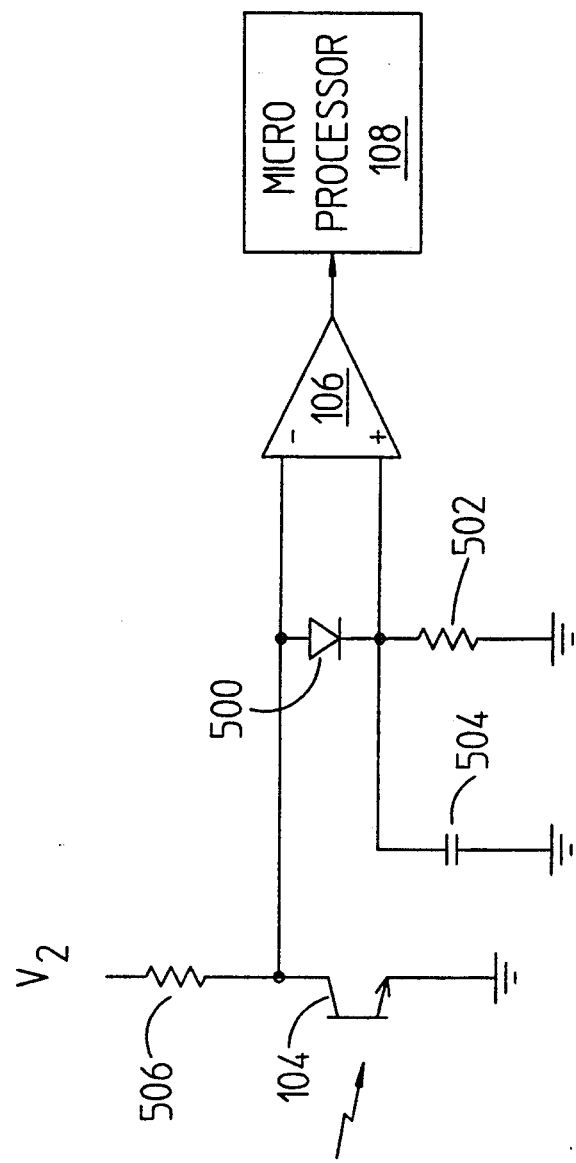
FIG. 5 is a block diagram schematic illustrating a second embodiment of the present invention.

FIG. 5 illustrates a schematic for a second embodiment of the present invention. In FIG. 5, if relatively little light reaches the phototransistor 104, then a diode 500 is forward biased and the comparator 106 is in an OFF state. Resistor 506 and capacitor 504 provide low-pass filtering for the comparator threshold. When an indicator is present, light is either transmitted or reflected to the phototransistor 104 which results in a collector voltage low enough to cause the comparator 106 to switch to an ON state. The diode 500 prevents the low collector voltage from discharging the filter capacitor 504. With proper initialization, the threshold voltage will continuously track minor changes in collector voltage.

Comparing FIG. 5 and FIG. 1, the circuit in FIG. 5 eliminates the pulse-width-modulator 112 or other digital to analog conversion. In addition, the circuit in FIG. 5 provides continuous threshold adjustment. If it can be guaranteed that an indicator is not present then no initialization is needed. However, in general, initialization for the circuit in FIG. 5 is required. For a sensor system as in FIG. 5, the threshold is initialized to the proper dark level by using a controller such as the microprocessor 108 to position the tape so that an indicator is not present. At power on, with or without an indicator present, the comparator 106 will be in an OFF state because the filter capacitor 504 will be initially discharged and the diode 500 will be forward biased as capacitor 504 is charging. With an indicator present at power on, the capacitor 504 will initially charge to a light level instead of a dark level. Therefore, after power on or after a tape is changed, the microprocessor 108 must move the tape a distance sufficient to ensure that any initial indicator is moved out of the light path. If no indicator was present at power on or tape insertion, the initial threshold is the desired dark threshold. If the initial tape movement then moves an indicator to the sensor, the diode 500 will prevent any change in that initial threshold. Therefore, with or without an initial indicator, after tape movement the capacitor 502 will be charged to a voltage corresponding to a dark level.

The circuit illustrated in FIG. 5 may be used with transmitted or reflected light. In addition, the circuit in FIG. 5 may be used with a pulsed light source as illustrated in FIG. 3. If the light source is pulsed, synchronous demodulation is needed as in FIG. 3 (flip-flop 302). In addition, if pulsed light is used, the values of resistors 502 and 506 and capacitor 504 must be adjusted to ensure that the discharge time for capacitor 504 is much greater than the off-time of the light pulse.

Figure 6:
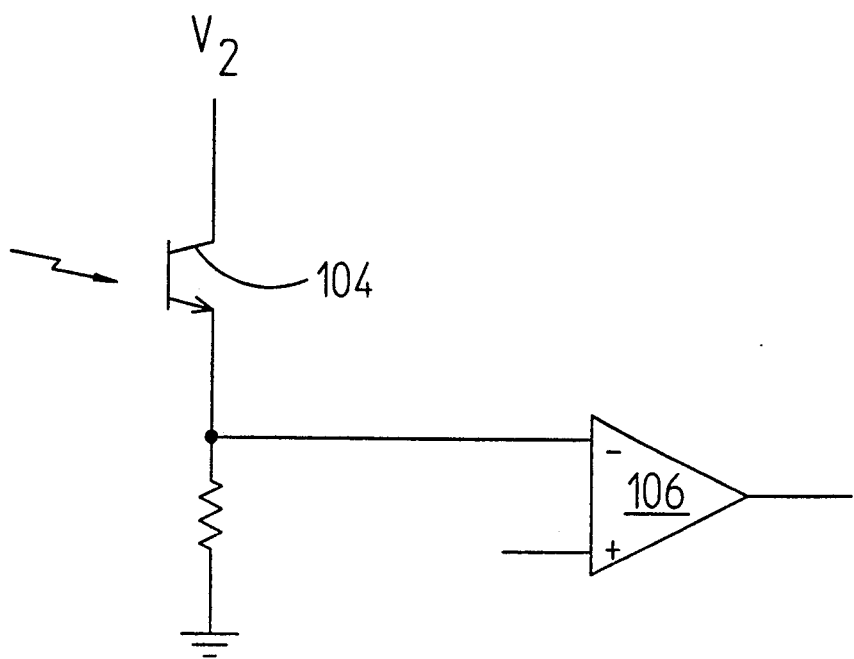
FIG. 6 is a partial schematic illustrating an alternative configuration of the sensor for the first embodiment of the present invention.

The phototransistor 104 illustrated in FIGS. 1-3 and 5 is connected to provide an output signal which is inversely proportional to light intensity. The circuits may also be configured for a sensor signal which is proportional to light intensity. FIG. 6 is a partial schematic illustrating an alternative configuration for the phototransistor for the first embodiment of the present invention. In FIG. 6, the signal provided by phototransistor 104 is proportional to light intensity. If the alternative configuration illustrated in FIG. 6 is used in the first embodiment of the present invention, then the final threshold is the lower of two thresholds plus an offset for noise margin.

Figure 7:
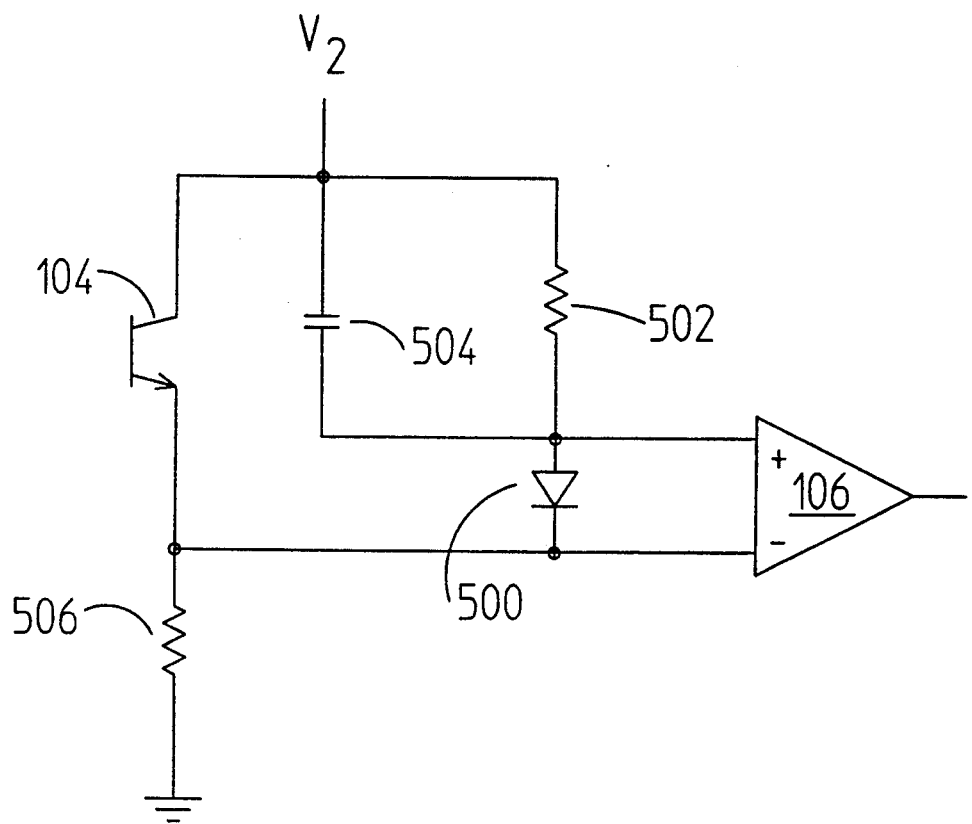
FIG. 7 is a partial schematic illustrating an alternative configuration of the sensor for the second embodiment of the present invention.

FIG. 7 is a partial schematic illustrating an alternative configuration of the phototransistor for the second embodiment of the present invention. In FIG. 7, the signal provided by phototransistor 104 is proportional to light intensity. Changing the light signal polarity also requires corresponding changes in the polarity of the inputs of comparator 106 as illustrated in FIG. 7. This permits the capacitor 504 to track a dark voltage which is lower than the light voltage.

Those familiar with the art will appreciate that other functional variations may be implemented. For example, phototransistor 104 may be replaced by functional equivalents such as photodiodes and solar cells.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An apparatus for detecting a beginning-of-tape indicator on a tape in a tape drive, the apparatus comprising:

a light source positioned to illuminate the beginning-of-tape indicator;

light sensor means, cooperatively positioned relative to the light source to receive light from the beginning-of-tape indicator, for providing a sensor output voltage in response to the received light intensity;

comparator means, having first and second analog inputs and a digital comparator output, for measuring whether the first analog input is less than the second analog input, wherein the first analog input is connected to the sensor output voltage;

threshold generation means, having an output connected to the second analog input and an input connected to the comparator output, for providing a threshold voltage at the second analog input;

wherein at a first tape position, the threshold generation means changes the threshold voltage until the comparator output switches, thereby determining a first temporary threshold voltage; and wherein the threshold generation means provides a final threshold voltage which is the first temporary threshold voltage less a predetermined offset voltage.

2. An apparatus as in claim 1 further comprising:

wherein at a second tape position, the threshold generation means changes the threshold voltage until the comparator output switches, thereby determining a second temporary threshold voltage; and wherein the final threshold provided by the threshold generation means is the maximum value of the first and second temporary threshold voltages less the predetermined offset voltage.

3. The apparatus of claim 2 wherein the beginning-of-tape indicator is substantially transparent and light from the light source passes through the beginning-of-tape indicator to the light sensor means.

4. The apparatus of claim 2 wherein the beginning-of-tape indicator is substantially reflective and light from the light source is reflected from the beginning-of-tape indicator to the light sensor means.

5. The apparatus of claim 2 wherein the light source is pulsed and the comparator output is synchronously demodulated in sync with the light pulses.

6. A method for determining a light threshold for optical detection of a beginning-of-tape indicator on a tape in a tape drive, wherein the beginning-of-tape indicator has an indicator length, the method comprising the following steps:

A. receiving light from the tape by a light sensor;

B. generating a sensor voltage signal, by the light sensor, in response to the intensity of received light;

C. generating a threshold voltage;

D. comparing the light voltage signal to the threshold voltage;

E. determining a first temporary threshold voltage by varying the threshold voltage until the threshold voltage is equal to the sensor voltage signal; and F. setting a final threshold voltage to the first temporary voltage less a predetermined offset voltage.

7. The method of claim 6 further comprising the following steps:

G. moving the tape a distance greater than the indicator length;

H. determining a second temporary threshold voltage by varying the threshold voltage until the threshold voltage is equal to the sensor voltage signal; and l. setting the final threshold voltage to the greater of the two temporary threshold voltages less the predetermined offset voltage.

8. An apparatus for detecting a beginning-of-tape indicator on a tape in a tape drive, the apparatus comprising:
  a light source positioned to illuminate the beginning-of-tape indicator;
  light sensor means, cooperatively positioned relative to the light source to receive light from the beginning-of-tape indicator, for providing a sensor output voltage in response to the received light intensity;
  comparator means, having first and second analog inputs and a digital comparator output, for measuring whether the first analog input is less than the second analog input, wherein the first analog input is connected to the sensor output voltage; and
  a diode having an anode and a cathode, the anode connected to the first analog input of the comparator means and the cathode connected to the second analog input of the comparator means.

9. The apparatus of claim 8 wherein the beginning-of-tape indicator has an indicator length and wherein the tape is moved a distance greater than the indicator length to initialize the second analog input of the comparator means.

10. The apparatus of claim 9 wherein the beginning-of-tape indicator is substantially transparent and light from the light source passes through the beginning-of-tape indicator to the light sensor means.

11. The apparatus of claim 9 wherein the beginning-of-tape indicator is substantially reflective and light from the light source is reflected from the beginning-of-tape indicator to the light sensor means.

12. The apparatus of claim 9 wherein the light source is pulsed and the comparator output is synchronously demodulated in sync with the light pulses.

* * * * *